United States Patent
Sakamoto et al.

(10) Patent No.: US 7,433,722 B2
(45) Date of Patent: Oct. 7, 2008

(54) PORTABLE DEVICE

(75) Inventors: Akemi Sakamoto, Higashihiroshima (JP); Kimiaki Imai, Higashihiroshima (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 568 days.

(21) Appl. No.: 11/175,432

(22) Filed: Jul. 7, 2005

(65) Prior Publication Data

US 2006/0019728 A1    Jan. 26, 2006

(30) Foreign Application Priority Data

Jul. 8, 2004   (JP) ............................. 2004-202134

(51) Int. Cl.
*H04M 1/00*   (2006.01)

(52) U.S. Cl. .............. 455/575.3; 455/556.1; 455/575.1; 396/348

(58) Field of Classification Search .............. 455/575.3
See application file for complete search history.

(56) References Cited

U.S. PATENT DOCUMENTS

| | | | |
|---|---|---|---|
| 5,278,779 A | 1/1994 | Conway et al. | |
| D448,032 S * | 9/2001 | Talley | D14/396 |
| 6,529,742 B1 | 3/2003 | Yang | |
| 6,530,121 B2 | 3/2003 | Hayashi | |
| 6,549,789 B1 * | 4/2003 | Kfoury | 455/550.1 |
| 6,658,272 B1 * | 12/2003 | Lenchik et al. | 455/575.1 |
| 6,728,557 B1 * | 4/2004 | Tracy et al. | 455/575.3 |
| 6,839,576 B2 * | 1/2005 | Aagaard et al. | 455/575.1 |
| 6,856,507 B2 * | 2/2005 | Chen et al. | 361/683 |
| 6,975,273 B1 * | 12/2005 | Choi | 343/702 |

(Continued)

FOREIGN PATENT DOCUMENTS

CN    1414767 A    4/2003

(Continued)

OTHER PUBLICATIONS

Anonymous, "Briefcase-Portable Textwriter with 100-Key Full-Size Keyboard," IBM Technical Disclosure Bulletin, vol. 27, 4A, Sep. 1984, US, pp. 2002-2004.

*Primary Examiner*—Matthew Anderson
*Assistant Examiner*—Hai V Nguyen
(74) *Attorney, Agent, or Firm*—Birch Stewart Kolasch & Birch, LLP

(57) ABSTRACT

A portable phone 1 includes a first housing 2, a second housing 4 having a display section 14, and a hinge section 3 that connects the first housing 2 and the second housing 4 so that the display section is positioned horizontally when placing the portable phone 1 on an object. The hinge section 3 includes a first rotation axis 5 that allows the hinge section 3 and the second housing 4 to rotate toward the first housing 2 and with a second rotation axis 6 that is disposed orthogonal to the first rotation axis 5 in a region apart from the second central face $\pi 2$ in the second housing 4. The distance between the second rotation axis 6 and the side face 4b on the second rotation axis 6 part with respect to the second central face $\pi 2$ in the second housing 4 is configured in such a way as to either substantially equal or be shorter than the distance between the first rotation axis 5 and the front face 7a of the first housing 2.

10 Claims, 9 Drawing Sheets

U.S. PATENT DOCUMENTS

| | | | |
|---|---|---|---|
| 6,999,802 B2* | 2/2006 | Kim | 455/575.1 |
| 6,999,803 B2* | 2/2006 | Jung | 455/575.3 |
| 7,006,853 B2* | 2/2006 | Kang et al. | 455/575.3 |
| 7,050,008 B2* | 5/2006 | Saito et al. | 343/702 |
| 7,050,767 B2* | 5/2006 | Hickey et al. | 455/90.3 |
| 7,099,702 B1* | 8/2006 | Lundy | 455/566 |
| 7,117,009 B2* | 10/2006 | Wong et al. | 455/556.1 |
| 7,149,557 B2* | 12/2006 | Chadha | 455/575.1 |
| 7,174,195 B2* | 2/2007 | Nagamine | 455/575.1 |
| 7,200,428 B2* | 4/2007 | Taninai | 455/575.3 |
| D545,287 S * | 6/2007 | Han et al. | D14/138 |
| 7,245,948 B2* | 7/2007 | Jung et al. | 455/575.1 |
| D548,212 S * | 8/2007 | Lee | D14/138 |
| 7,330,742 B2* | 2/2008 | Kang et al. | 455/575.3 |
| 2002/0128053 A1 | 9/2002 | Jung | |
| 2003/0040288 A1 | 2/2003 | Kang et al. | |
| 2003/0064758 A1* | 4/2003 | Mizuta et al. | 455/566 |
| 2003/0203747 A1* | 10/2003 | Nagamine | 455/575.3 |
| 2003/0223576 A1 | 12/2003 | Totani | |
| 2004/0014488 A1 | 1/2004 | Sawayama et al. | |
| 2004/0048632 A1* | 3/2004 | Kuroda | 455/550.1 |
| 2004/0066616 A1 | 4/2004 | Chen et al. | |
| 2004/0198474 A1* | 10/2004 | Jung et al. | 455/575.1 |
| 2004/0204059 A1* | 10/2004 | Wong et al. | 455/556.1 |
| 2004/0209645 A1* | 10/2004 | Park et al. | 455/556.1 |
| 2004/0219957 A1* | 11/2004 | Nishijima et al. | 455/575.3 |
| 2004/0224729 A1* | 11/2004 | Watanabe et al. | 455/575.3 |
| 2004/0224730 A1* | 11/2004 | Sakai et al. | 455/575.3 |
| 2004/0235540 A1* | 11/2004 | Yajima | 455/575.3 |
| 2005/0037821 A1* | 2/2005 | Takagi | 455/575.3 |
| 2005/0064919 A1* | 3/2005 | An et al. | 455/575.3 |
| 2005/0079897 A1* | 4/2005 | Nishijima et al. | 455/575.1 |
| 2005/0079901 A1* | 4/2005 | Tracy et al. | 455/575.3 |
| 2005/0125570 A1* | 6/2005 | Olodort et al. | 710/15 |
| 2006/0063570 A1 | 3/2006 | Nishimura | |
| 2006/0111160 A1* | 5/2006 | Lin et al. | 455/575.3 |
| 2006/0135225 A1* | 6/2006 | Lin et al. | 455/575.3 |
| 2007/0032276 A1 | 2/2007 | Sawayama et al. | |
| 2007/0032277 A1 | 2/2007 | Sawayama et al. | |
| 2007/0161415 A1 | 7/2007 | Sawayama et al. | |
| 2007/0161416 A1 | 7/2007 | Sawayama et al. | |
| 2007/0173292 A1 | 7/2007 | Sawayama et al. | |
| 2007/0173299 A1 | 7/2007 | Sawayama et al. | |

FOREIGN PATENT DOCUMENTS

| | | |
|---|---|---|
| DE | 19961067 A1 | 6/2000 |
| DE | 19962921 A1 | 6/2000 |
| DE | 20308299 U1 | 8/2003 |
| EP | 1298890 A2 | 4/2003 |
| GB | 2347051 A | 8/2000 |
| GB | 2347589 A | 9/2000 |
| JP | 2000-78549 A | 3/2000 |
| JP | 2001-156893 A | 6/2001 |
| JP | 2002-118633 A | 4/2002 |
| JP | 2002-132418 A | 5/2002 |
| JP | 2003-60759 A | 2/2003 |
| JP | 2003-110673 A | 4/2003 |
| JP | 1298890 A2 | 4/2003 |
| JP | 2003-239943 A | 8/2003 |
| JP | 2003-309756 A | 10/2003 |
| JP | 2003-319043 A | 11/2003 |
| JP | 2004-64716 A | 2/2004 |
| JP | 2004-120513 A | 4/2004 |
| JP | 2004-173299 A | 6/2004 |
| JP | 2004-180021 A | 6/2004 |
| WO | WO-2004/047412 A1 | 6/2004 |

* cited by examiner

PORTABLE DEVICE

This Nonprovisional application claims priority under 35 U.S.C. § 119(a) on Patent Application No. 202134/2004 filed in Japan on Jul. 8, 2004, the entire contents of which are hereby incorporated by reference.

FIELD OF THE INVENTION

The present invention relates to a portable device, and more specifically, relates to a portable device including two rotatable housings.

BACKGROUND OF THE INVENTION

Conventionally, foldable portable phones that include two housings and that can be folded/unfolded have become widespread. FIG. 9 shows an example thereof. The portable phone 1 includes a first housing 2, a second housing 4, and a hinge section 3 connected both to the first housing 2 and the second housing 4. The first housing 2 includes components such as input buttons 9, function buttons 10, and a microphone hole 11. The second housing 4 includes components such as a display section 14 and a receiver 15. The second housing 4 is rotatable with respect to the first housing 2 on a first rotation axis 5 disposed in the hinge section 3. This allows the portable phone 1 to be unfolded and to be folded. FIG. 9 illustrates the portable phone 1 in an unfolded state, and FIG. 10 illustrates the portable phone 1 in a folded state.

Recently, foldable portable phones have become increasingly widespread, and even a foldable portable phone having two axes that are disposed in a hinge section and that can be rotated independently from each other has come to the market. Examples thereof can be found in Reference 1 (Japanese Patent Application Publication No. 2002-118633, published on Apr. 19, 2002), in Reference 2 (Japanese Patent Application Publication No. 2003-239943, published on Aug. 27, 2003), and in Reference 3 (Japanese Patent Application Publication No. 2003-309756, published on Oct. 31, 2003).

In Reference 1, a first rotation axis for folding both housings and a second rotation axis disposed orthogonal to the first rotation axis are included, and when an upper housing is reversed 180 degrees on the second rotation axis and is folded, an image display section becomes visible, and therefore the screen can be watched without folding/unfolding the foldable portable phone in a reception waiting operation state. Reference 1 also indicates that users can play games on the foldable portable phone without occupying a space.

Reference 2 indicates that in an electronics device in which a main body on which an operation section is disposed and a covering section on which a display section is disposed are connected to each other in such a way that the covering section covers the operation section at the time when the operation section is not in operation, the covering section is disposed in such a way that it can be freely folded, unfolded and rotated, and two axes are disposed in such a way that the covering section can be freely pivoted and rotated 180 degrees on a pivot rotation section that is orthogonal to a rotation axis section so that the display section can be concealed or can be exposed on the upper face of the electronics device.

In Reference 3, a liquid crystal monitor section having a liquid crystal monitor and an operation section having operation buttons are disposed in such a way as to be rotatable on a hinge section, and a rotator is disposed in between the hinge section and the liquid crystal monitor section in such a way as to be rotatable at an angle between 0 degree and 360 degrees, and an photograph lens and a plurality of zoom lenses are further disposed on a central axis of the hinge section. This allows the liquid crystal monitor section to turn at 90 degrees clockwise so as to take self-portrait pictures, or to turn at 90 degrees counterclockwise so as to take pictures of other people.

On the other hand, reference arts in connection with a liquid crystal screen to be watched horizontally instead of vertically are described in Reference 4 (Japanese Patent Application Publication No. 2001-156893, published on Jun. 8, 2001), Reference 5 (Japanese Patent Application Publication No. 2003-319043, published on Nov. 7, 2003), and Reference 6 (Japanese Patent Application Publication No. 2004-64716, published on Feb. 26, 2004).

In Reference 4, a unit section that turns a liquid crystal display section from a vertical position to a horizontal position or vice versa, and a display change-over section for changing the display of the liquid crystal display section from vertical to horizontal or vice versa along with the rotation of the display unit section are included to satisfy a demand for reading a vast amount of information with a horizontally positioned liquid crystal display section.

In Reference 5, a lower unit having an operation section, an upper unit having a display unit, and a hinge coupling the lower unit with the upper unit in such a way as to be folded/unfolded are included, and the upper unit has a display unit, a supporting unit, and a rotation/sliding mechanism. When the display unit is in a horizontal state as a result that the display unit is rotated/slidden, the horizontal state of the display is detected, and then the displayed contents are switched in accordance with the state of the display screen.

In Reference 6, a liquid crystal display section is supported by a supporting section connected to a base section of the main body of a telephone, and the liquid crystal display section is rotated in the horizontal direction at an angle of substantially 90 degrees, and the rotation is detected by a rotation direction detection circuit, so that the contents location and the display settings are adjusted in line with the display screen in a wide state.

Recently, a portable communication device equipped with a television receiver has come to the market. When a television receiver is installed in the portable communication devices disclosed in References 1, Reference 2, and Reference 3, the housing is positioned vertically under conceived places such as being on hand or being placed on a table, and the display section is vertically long. However, television is generally to be watched with a horizontally long screen. In order to watch television with a horizontally long display screen in the above-mentioned portable communication devices, a user is required either to turn the device horizontally or to incline his/her face. When the device is placed on the user's hand, the user can solve the aforesaid problem by holding the lower housing horizontally. However, when the device is placed on an object such as a desk, the user is required to obliquely incline his/her face and to look into the screen. In addition, if the upper housing and the display section in the vertical disposition are to be watched, it would bring a consequence either that the entire picture of television is narrowed or that the left and right edges of the picture are cut off.

SUMMARY OF THE INVENTION

In view of the above problems in the reference arts, the present invention has as an object to provide a portable device with a display section that can be positioned horizontally when the portable device is placed on an object.

In order to solve the above-mentioned problems, a portable device in connection with the present invention includes a first housing, a second housing having a display section, and a hinge section connected both to the first housing and the second housing. The hinge section is rotatable, with respect to the first housing, on a first rotation axis 1 disposed in a connecting section between the hinge section and the first housing. The second housing is rotatable, with respect to the hinge section, on a second rotation axis disposed in a connecting section between the second housing and the hinge section toward the hinge section. The second rotation axis is disposed in such a way as to be substantially orthogonal to the first rotation axis at a place apart from a central face of the second housing, the central face being orthogonal to the first central axis.

The foregoing structure allows the second housing to rotate at any angles on the second rotation axis that is disposed substantially orthogonal to the first rotation axis and is in a region away from the central face of the second housing. Therefore, the display section can be positioned horizontally by rotating the second housing on the second rotation axis and then folding the hinge section in such a way as to overlap the first housing, when the portable device is placed on an object.

Further, combination of the rotation on the first rotation axis and the rotation on the second rotation axis allows the display section to face any directions and to be positioned any ways including vertically, horizontally, or between vertical and horizontal. Therefore, when placing the portable device on an object, the user may adjust the display section to face a desired direction and to be positioned at a desired way.

For a fuller understanding of the nature and advantages of the invention, reference should be made to the ensuing detailed description taken in conjunction with the accompanying drawings.

DESCRIPTION OF THE EMBODIMENTS

An embodiment of the present invention is described below with reference to the accompanied drawings, but a portable device in connection with the present invention is not limited to the embodiment. Following describes a portable phone as an example of a portable device in connection with the present invention.

Figure 1:
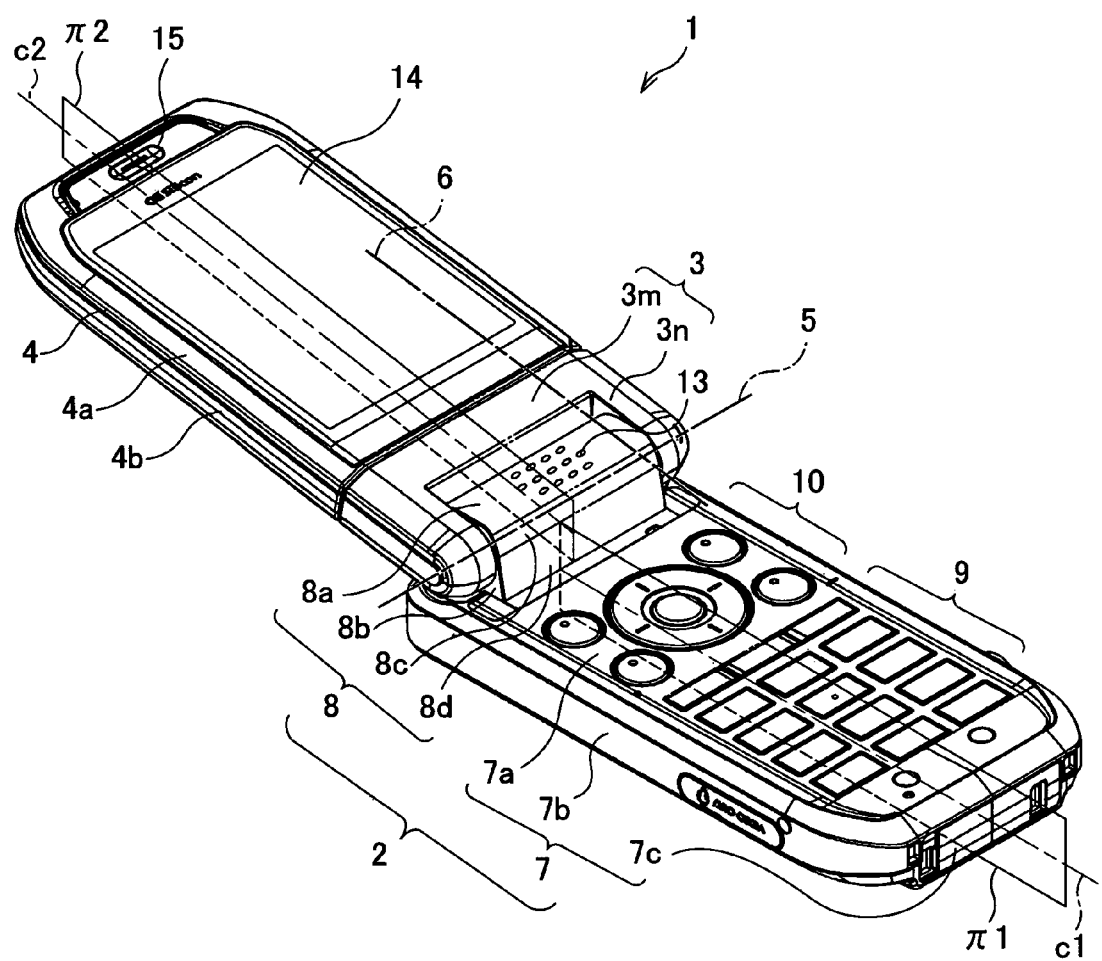
FIG. 1 illustrates an embodiment of the present invention and is a perspective view of a portable phone in an unfolded state.

A structure of a portable phone in connection with the embodiment in the present invention is schematically described below. FIG. 1 is a perspective view of a foldable portable phone 1 in an unfolded state. The portable phone 1 includes a first housing 2, a hinge section 3, and a second housing 4. The first housing 2 is a housing including buttons that receive an operation by a user. The second housing 4 is a housing including a display section 14 that displays an image. The hinge section 3 connects the first housing 2 and the second housing 4. The hinge section 3 is connected to the first housing 2 so as to be freely rotatable on the first rotation axis 5, and the second housing 4 is connected to the hinge section 3 so as to be freely rotatable on a second rotation axis 6 that is orthogonal to the first rotation axis 5.

Figure 2:
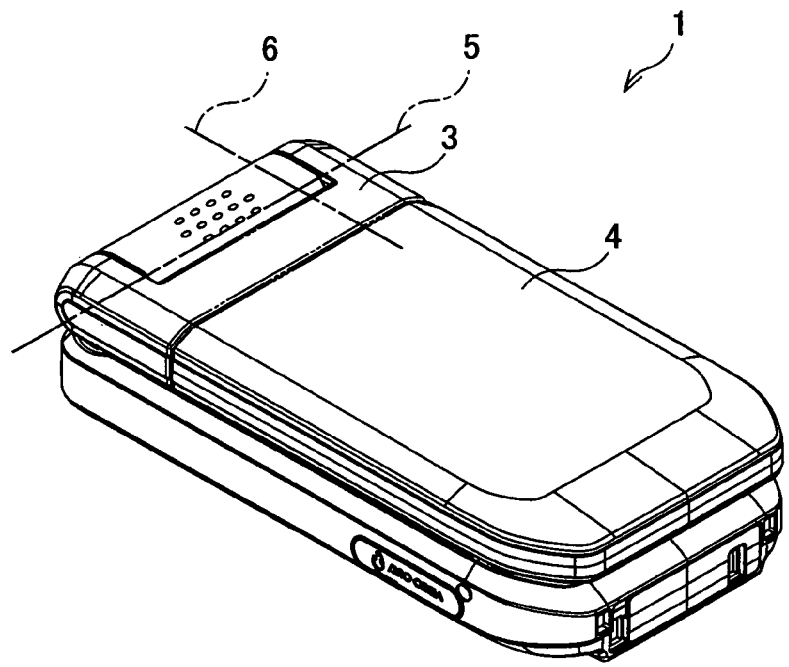
FIG. 2 illustrates an embodiment of the present invention and is a perspective view of the portable phone in FIG. 1 in a folded state, viewing in a first direction.
Figure 3:
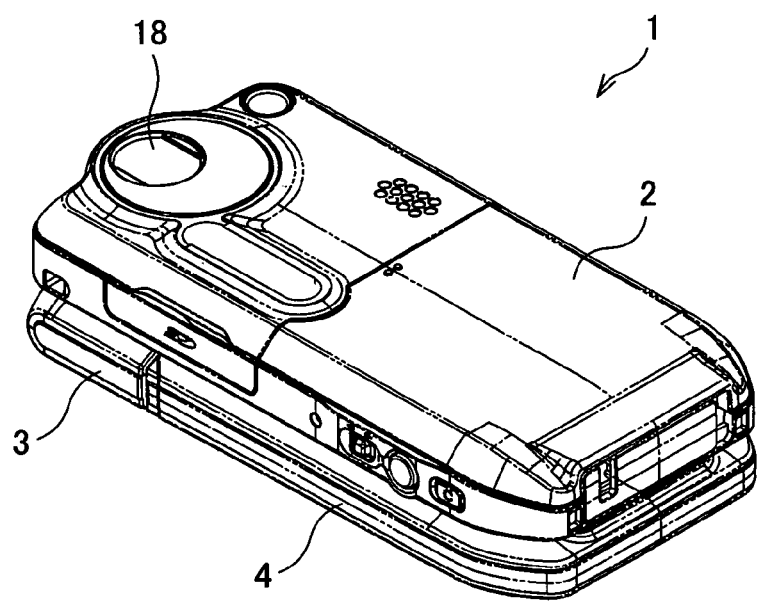
FIG. 3 illustrates an embodiment of the present invention and is a perspective view of the portable phone in FIG. 1 in a folded state, viewing in a second direction.
Figure 6:
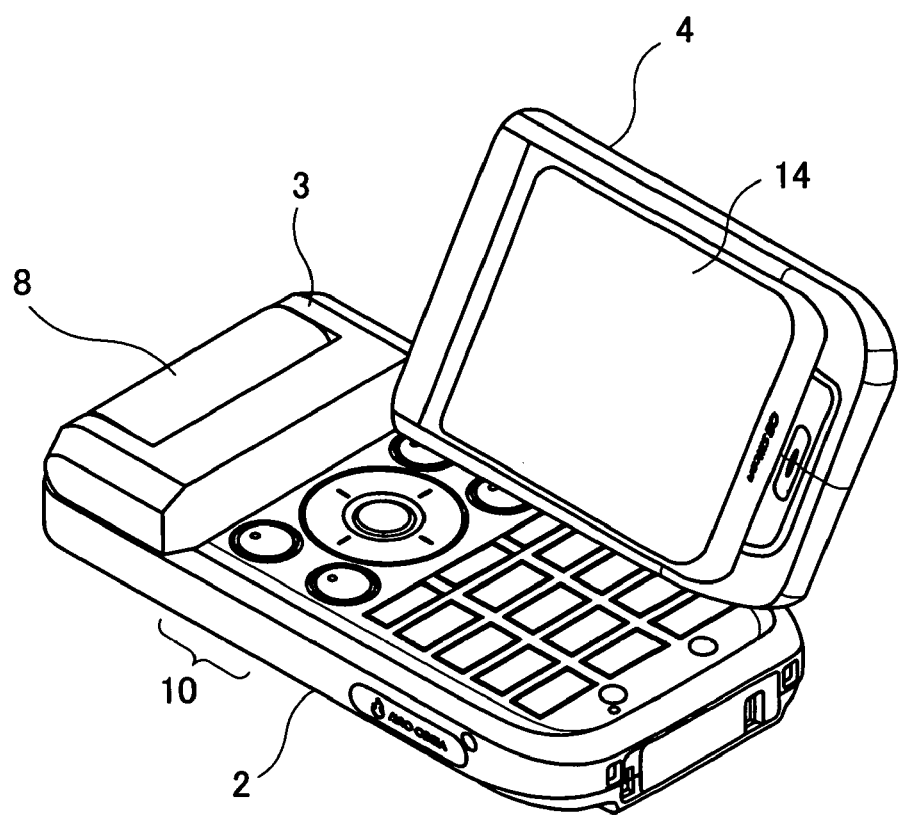
FIG. 6 illustrates an embodiment of the present invention and is a perspective view of the portable phone 1 in FIG. 5 in a state in which the hinge section is rotated on the first rotation axis so as to overlap the first housing.

The portable phone 1 can be switched from an unfolded state, as shown in FIG. 1, to a folded state, as shown in FIG. 2 and in FIG. 3, by rotating the hinge section 3 and the second housing 4 on the first rotation axis 5 toward the first housing 2 so as to make the first housing 2 and the hinge section 3 opposed to each other. FIG. 2 illustrates the portable phone 1 in a folded state, viewing from the second housing 4, and FIG. 3 illustrates the portable phone 1 in a folded state, viewing from the first housing 2. In the embodiment, the face of the first housing 2 and the face of the second housing 4, both of which oppose to each other when the portable phone 1 is in a folded state as shown in FIG. 2 and FIG. 3, are respectively named a front face 7a of the first housing 2 and a front face 4a of the second housing 4, as mentioned below. Moreover, in the portable phone 1, the display section 14 can be watched even when the portable phone 1 is in the folded state as shown in FIG. 6, by rotating the second housing 4 on the second rotation axis 6 with respect to the hinge section 3. Further, as shown in FIG. 3, the first housing 2 is equipped with a photographing lens 18. Further, the portable phone 1 in the embodiment is equipped with a television broadcasting receiver means (not illustrated), and a user may watch television pictures by displaying received television broadcast on the display section 14.

Here, the term "a side face of the second housing 4" indicates a side face of the second housing 4 in the case in which the front face 4a of the second housing 4 is made to be either a top face or a bottom base.

As foregoing describes, the portable phone 1 is a foldable portable phone including a camera/television function, and one of the housings can be rotated.

Following describes in detail the structure of the portable phone 1.

The first housing 2, the second housing 4, and the hinge section 3 are made of plastic resin such as ABS (Acrylonitril Butadiene Styrene resin) or PC-ABS (Polycarbonate-Acrylonitrile Butadiene Styrene resin).

The first housing 2, as shown in FIG. 1, includes a base section 7 and a projection section 8.

The base section 7 includes (i) a flat substantially rectangular parallelepiped shaped chassis having a substantially rectangular shaped front face 7a as its top face and (ii) an interior section. The chassis, as recognizable in FIG. 1 or in FIG. 3, is properly chamfered. The front face 7a includes input buttons 9 and function buttons 10 as the aforesaid buttons, and the front face 7a is to be sandwiched in between the hinge section 3 and the second housing 4 when the portable phone 1 is folded. The input button 9 is for inputting a numeral and a text, and the function button 10 is for a setting-up and for switching a function. The input button 9 and the function button 10 are disposed next to each other along the longer side of the front face 7a. The key top section of the input button 9 and the function button 10 are made of plastic resin such as ABS or PC-ABS. Further, the key top sections of the function button 10 are plated by coatings such as chromium-plate. The input button 9 and the function button 10 are disposed in such a way that a key operation would not be conducted due to thrust of the hinge section 3 or the second housing 4 when folding/unfolding operations of the portable phone 1 is conducted and when the portable phone 1 is folded. Further, a button such as a shuttering button (not illustrated) that is operated when the camera section accommodated in the first housing 2 is in use is disposed on one of the pair of side faces 7b that are along with and orthogonal to the front face 7a.

A projection section 8 sticks up perpendicularly to the front face 7a, from a dent section that is formed around the shorter side of the front face 7a on the function buttons 10 side, in such a way as to dent from the front face 7a. This projection section 8 is surrounded by a top face 8a, a pair of side faces 8b, a pair of side faces 8c, and a pair of curved faces 8d. The top face 8a is parallel to the front face 7a. The side faces 8b are parallel to the side faces 7b. The side faces 8c are parallel to the side faces 7c of the base section 7c that are along with and orthogonal to the front face 7a. The respective curved faces 8d smoothly connects the top face 8a and the side faces 8c. The curved faces 8d can be replaced by a plurality of flat faces. A first rotation axis 5 runs above the aforesaid shorter side of the front face 7a and its neighborhood, and is parallel to the shorter side with a certain distance in between. The projection section 8 supports a member forming the first rotation axis 5 with the side faces 8b positioned on both axial ends. The respective side faces 8b are connected to the front face 7a, with a certain distance inward from the respective side faces 7b. In other words, the central part, in the axial direction of the first rotation axis 5, of the projection section 8 is on a flat face that (i) includes the central axis c1 of the first housing 2, the central axis c1 being parallel to the longer side of the front face 7a, and (ii) is orthogonal to the first rotation axis 5 (the flat surface will be referred as a first central face $\pi 1$ hereinafter). The projection section 8 accommodates a camera section and a speaker section in its interior. A top face 8a and a curved face 8d include a speaker hole 13, and sound such as a melody signaling an incoming call from the speaker is outputted with high quality sound.

The hinge section 3 is a thick, squarely curved, and U-shaped section including a central section 3m, which corresponds to the bottom of the U-shape, and a pair of end sections 3n, which correspond to the arms of the U-shape. The end sections 3n are freely-rotatably connected to the side faces 8b of the projection section 8 in such a way as to surround the side faces 8b in the directions from the both ends to the midpoint of the first rotation axis 5. The connection sections between the end sections 3n and the side faces 8b make up parts of the first rotation axis 5. Accordingly, the central section 3m is in parallel to the first rotation axis 5, and the end sections 3n are in parallel to the second rotation axis 6. Further, the hinge section 3 accommodates a hinge unit (not illustrated) and an antenna (not illustrated), in its interior. Communication with a base station is made through the antenna. The hinge unit connects the end sections 3n and the side faces 8b in a freely rotatable manner. Further, the hinge unit also connects the central section 3m and the second housing 4 in a freely rotatable manner.

The second housing 4 is a flat substantially rectangular parallelepiped shaped housing having a substantially rectangular shaped front face 4a as its top face, and is connected to the hinge section 3 by means of the second rotation axis 6. As recognizable in FIG. 1 and FIG. 3, the faces of the second housing 4, except for the face connected to the hinge section 3, are properly chamfered. The thickness of the flat rectangular parallelepiped is equal to the thickness of the hinge section 3. Therefore, when the flat rectangular parallelepiped and the hinge section 3 are connected in such a way that the rotation angle on the second rotation axis 6 is 0 degree, a flat substantially rectangular parallelepiped is formed. Further, the second rotation axis 6 is parallel to the longer sides of the front face 4a. In a condition in which the above-mentioned rotation angle is 0 degree, the second rotation axis 6 is a certain distance away from a flat face, toward one end section 3n of the hinge section 3. The flat face (i) includes the central axis c2 in the second housing 4, the central axis c2 being parallel to the longer sides of the front face 4a, and (ii) is orthogonal to the first rotation axis 5 (the flat surface will be referred as a second central face $\pi 2$ hereinafter). In other words, the second rotation axis 6 is not on the second central face $\pi 2$. The second central axis 6 is always parallel to the second central face $\pi 2$ even when the hinge section 3 rotates on the first rotation axis 5. Because the central part of the projection section 8 on the first housing 2 exists on the first central face $\pi 1$, this second central face $\pi 2$ is flush with the first central face $\pi 1$. When the first central face $\pi 1$ is flush with the second central face $\pi 2$, the second rotation axis 6 is orthogonal to the rotation axis 5, at the region where the respective distances to the side faces 8b are not equal. The second rotation axis 6 may be a certain distance away from the second central face $\pi 2$ toward the other end section 3n side. Further, the distance between the second rotation axis 6 and one of the side faces 4b which include the longer side of the front face 4a and are orthogonal to the front face 4a, the one of the side faces 4b being closer to the second rotation axis 6, is slightly shorter than the distance between the first rotation axis 5 and the front face 7a of the first housing 2. In other words, the distance between the second rotation axis 6 and one of the side faces 4b, which is on the same side as the second rotation axis 6 with respect to the second central face $\pi 2$, is slightly shorter than the distance between the first rotation axis 5 and the front face 7a of the first housing 2.

The display section 14 is disposed on the front face 4a, is substantially rectangular shaped, and has a longer side that is substantially parallel to the longer side of the front face 4a. As in the case of the conventional art, the shape of the display section 14 corresponds to the rectangular shape of the front face 4a. The display section 14 includes a display, such as a liquid crystal display or an EL (Electro Luminescent) display, and it displays an image based upon the image data transmitted through a display driver section. A receiver hole 15 that is used for purposes such as telephonic communication is perforated in the region around the shorter side of the front face 4a, the shorter side opposite to the one on the hinge section 3 side.

The range of rotation angle of the second housing 4 with respect to the hinge section 3 is set between 0 degree and 180 degrees. In the embodiment, the second rotation axis 6 is set to be rotatable between 0 degree and 180 degrees clockwise, when viewing in the direction from the second housing 4 to the hinge section 3. The rotation direction is not necessarily clockwise and may be either clockwise or counterclockwise, depending upon to which direction the second rotation axis 6 is biased with respect to the equidistant face, the second central face π2.

A signal wire (not illustrated) runs from the interior of the first housing 2 to the interior of the second housing 4. The signal wire, first of all, runs from the interior substrate in the first housing 2 to the interior of the projection section 8. Then, the signal wire runs through the interior region in the first rotation axis 5 to the interior of one of the end sections 3*n* of the hinge section 3, the one of the end section 3*n* being closer to the second rotation axis 6. In other words, in the hinge section 3, the signal wire runs through the region close to the second rotation axis 5 with respect to the second central face π2. Further, the signal wire runs through the interior of the second rotation axis 6 to the interior substrate of the second housing 4. Information, such as images, that is processed in the first housing 2 and is outputted is forwarded to the second housing 4 through the signal wire, and the image is displayed on the display section 14. Likewise, a received signal of television broadcasting is processed in the first housing 2 in the same way as mentioned above, is forwarded through the signal wire, and is displayed on the display section 14.

The signal wire is wired in the hinge section 3 in such a way as to run through the region on the second rotation axis 5 side with respect to the second central face π2. This shortens the length of the signal wire that connects the first housing 2 and the second housing 4, and therefore the wiring cost can be reduced. At the same time, the curvature of the signal wire becomes small. Therefore, disconnection of the signal wire can be easily prevented, and the signal wire can last longer.

Figure 4:
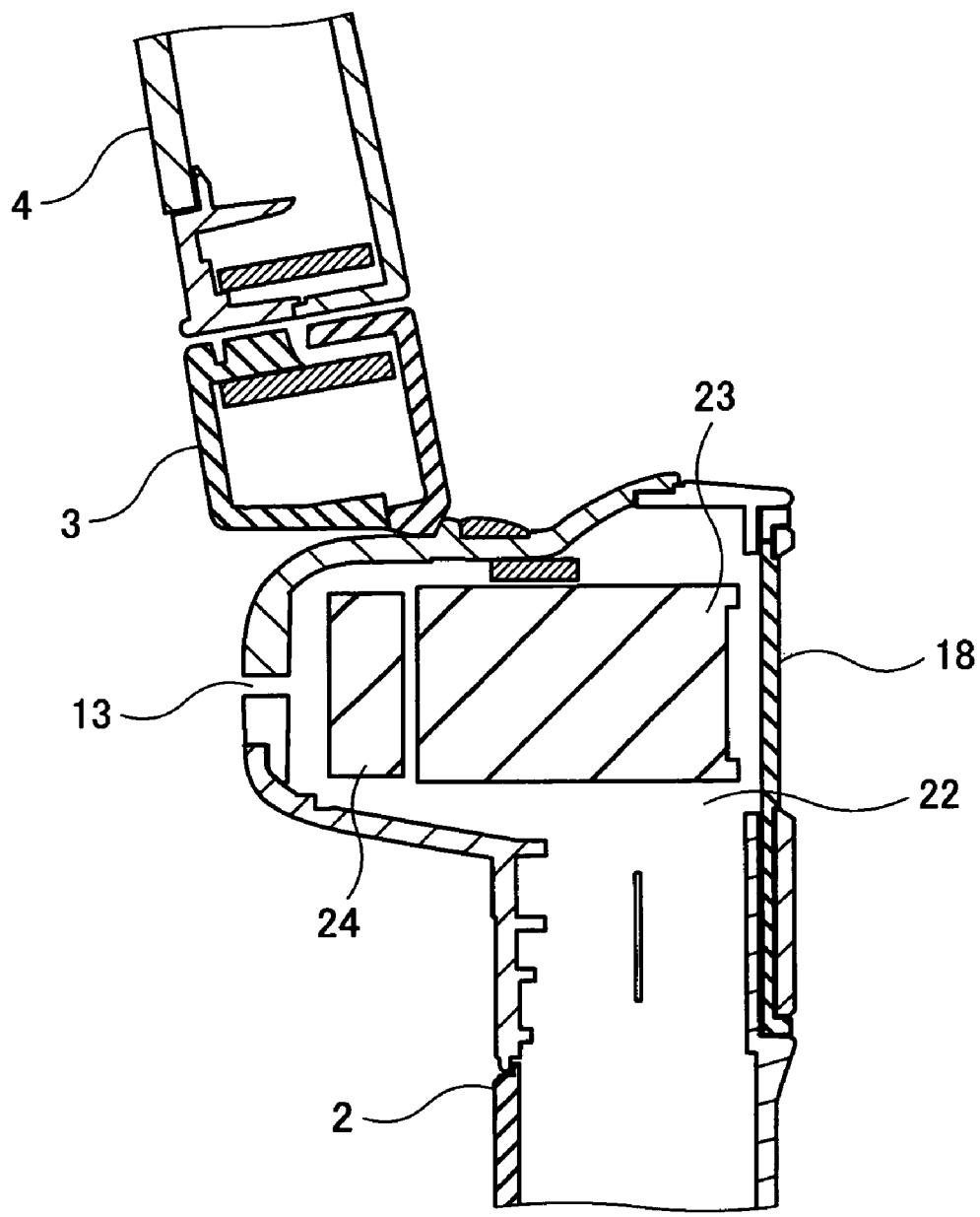
FIG. 4 illustrates an embodiment of the present invention and is a cross sectional view of the portable phone in FIG. 1 along a first central face.

The foregoing structure allows the projection section 8 to accommodate a camera section 23 and a speaker 24 in an inner space 22, as illustrated in FIG. 4. Therefore, even if the camera section 23 is a large camera including functions such as an optical zoom, the camera section 23 and the speaker 24 together can be accommodated in the projection section 8 without making a bump on the front face 7*a* of the first housing 2. This allows the first housing 2 not to be thick, and therefore the portable phone 1 can be downsized.

In the foldable portable phone 1 with the foregoing configuration, the display section 14 is usually positioned vertically when displaying a text and a picture. However, because a television screen is horizontally long, displaying a picture with the original vertical/horizontal ratio on the display section 14 results in narrowing the picture or cutting the edges of the picture. Following describes a case where the display section 14 of the portable phone 1 in connection with the embodiment is horizontally positioned and a television image displayed thereon is watched.

A user may watch television with the portable phone 1 in various situations. For example, a user may watch television with a portable phone placed on a desk or on the user's hand. A user lying down on a floor may watch television with a portable phone placed on a table. It is preferable that an elevation/depression angle of the display be adjustable depending upon a physical relationship between the user's eye and the height of the display section 14. When a user watches the display section 14 placed on a desk or on the user's hand, the display section 14 positions below the user's eyes. On the other hand, when a user lying down on a floor watches the display section 14 placed on a table, the display section 14 positions above the user's eye.

Figure 5:
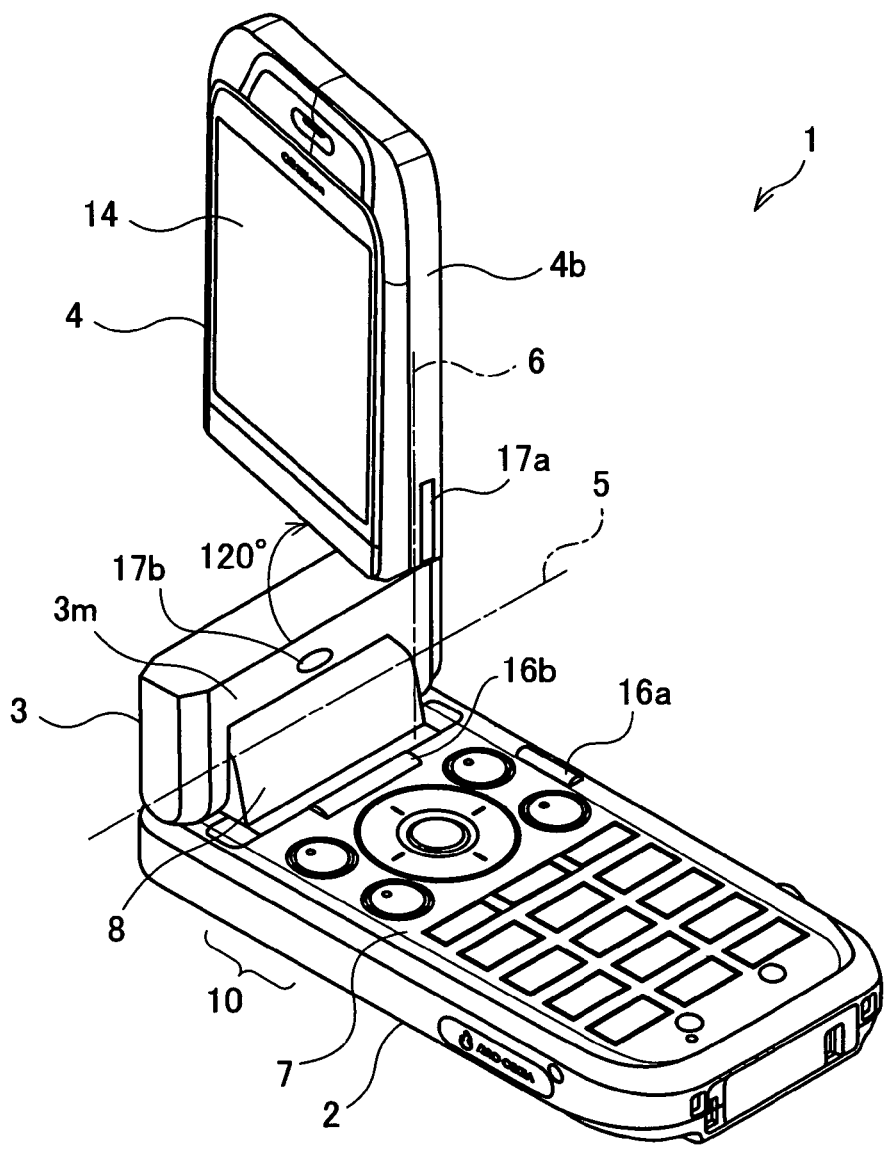
FIG. 5 illustrates an embodiment of the present invention and is a perspective view of the portable phone in FIG. 1 in a state in which the second housing is rotated 120 degrees on the second rotation axis.

When a user watches the portable phone 1 placed on a desk or on the user's hand, the second housing 4 is rotated 120 degrees on the second rotation axis 6 with the second housing 4 being rotated at a right angle on the first rotation axis 5, as illustrated in FIG. 5. A clicking sense is given when the rotation angle of the second housing 4 reaches 120 degrees so as to modestly restrain the rotation. When rotation of the second housing 4 over 120 degrees is attempted, the second housing 4 is allowed to be rotated up to 180 degrees. In order to provide a clicking sense, a component that modestly restrains but does not fixedly stops the movement on the second rotation axis 6 at a certain rotation angle may be disposed. Another way of modestly restraining the rotation is to provide a clicking sound upon restraining the second rotation axis 6. With this, a user can easily set the rotation angle of the second housing 4 at a certain angle. Besides, in the situation in which the portable phone 1 is placed on an object such as a desk or a floor, unintended rotations of the second housing 4 due to its own weight can be prevented. In this case, a clicking sense is not necessary.

In the situation in which the second housing 4, being in the state illustrated in FIG. 5, is rotated and is folded 90 degrees on the first rotation axis 5, as illustrated in FIG. 6, a buffer section 17*a* is disposed on the side face 4*b* of the second housing 4 that overlaps the front face 7*a* of the first housing 2. In addition, a convex section 16*a* is disposed at a spot on the first housing 2, the spot being to be in contact with the buffer section 17*a*. Consequently, the buffer section 17*a* and the convex section 16*a* are to be coupled to each other when the second housing 4 is closed. As a result, the second housing 4 can be properly supported with the convex section 16*a* and the buffer section 17*a*. Therefore, the rotation on the second rotation axis 6 is restrained, and the second housing 4 is stabilized. In FIG. 5, the buffer section 17*a* is disposed at the spot on the side face 4*b* and closest to the hinge section 3, in such a way as to extend in the longer side direction. Due to the limited space on the front face 7*a*, the convex section 16*a* is disposed at the outermost section on the front face 7*a* in such a way as to extend in the longer side direction. In order to correspond to the position of the convex section 16*a*, the buffer section 17*a* is disposed at the spot on the side face 4*b* and close to the face opposite to the front face 4*a* of the second housing 4. The positions of the buffer section 17*a* and the convex section 16*a* can be switched.

Further, a buffer section 17*b* is disposed on the central part of the top surface of the central section 3*m* of the hinge section 3, the central part overlapping the front face 7*a* when the portable phone is folded. In addition, a convex section 16*b* is disposed so as to overlap the buffer section 17*b* on the front face 7*a*. Consequently, the buffer section 17*b* and the convex section 16*b* are to be coupled to each other when the second housing 4 is closed. As a result, the hinge section 3 can be properly supported with the convex section 16*b* and the buffer section 17*b*. Therefore, the rotation on the first rotation axis 5 is restrained, and the second housing 4 is stabilized. The convex section 16*b*, as recognizable in FIG. 5 and FIG. 6, is disposed on the front face 7*a* and in between the function buttons 10 and the projection section 8. The positions of the buffer section 17*b* and the convex section 16*b* can be switched.

At this time, the longer sides of the display section 14 are substantially horizontal. In other words, the display section 14 is positioned horizontally, and the display section 14 is facing upward at an angle of 30 degrees. The foregoing operations, therefore, allow a user to watch television with a horizontally positioned screen facing upward at an angle of 30 degrees. The elevation angle of the display section 14 depends upon the rotation angle of the second housing 4, is not limited to an upward angle of 30 degrees, and can be set at a desired angle. On assumption that a user may watch the display section 14 at obliquely upward angle, a clicking sense is to be given at a certain angle in a range of 90 to 150 degrees when the second housing 4 is rotated on the second rotation axis 6. This allows a user to easily set the second housing 4 at a desired rotation angle when directing the display section 14 at a obliquely upward angle.

It is preferable that the buffer sections 17a and 17b be made of cushioning material, such as rubber, that would not scratch the members with which the buffer sections are in contact. This prevents scratches on the contacting faces of the convex sections 16a and 16b and the buffer sections 17a and 17b when they are in contact. Further, although the convex section 16b and the buffer section 17b are to be coupled with each other when the second housing 4 is folded so as to overlap the first housing 2, an approximately one-millimeter-clearance is reserved in between the convex section 16b and the buffer section 17b so that the input buttons 9 and the function buttons 10, both of which are on the first housing 2, are not to be in contact with the second housing 4.

Figure 7:
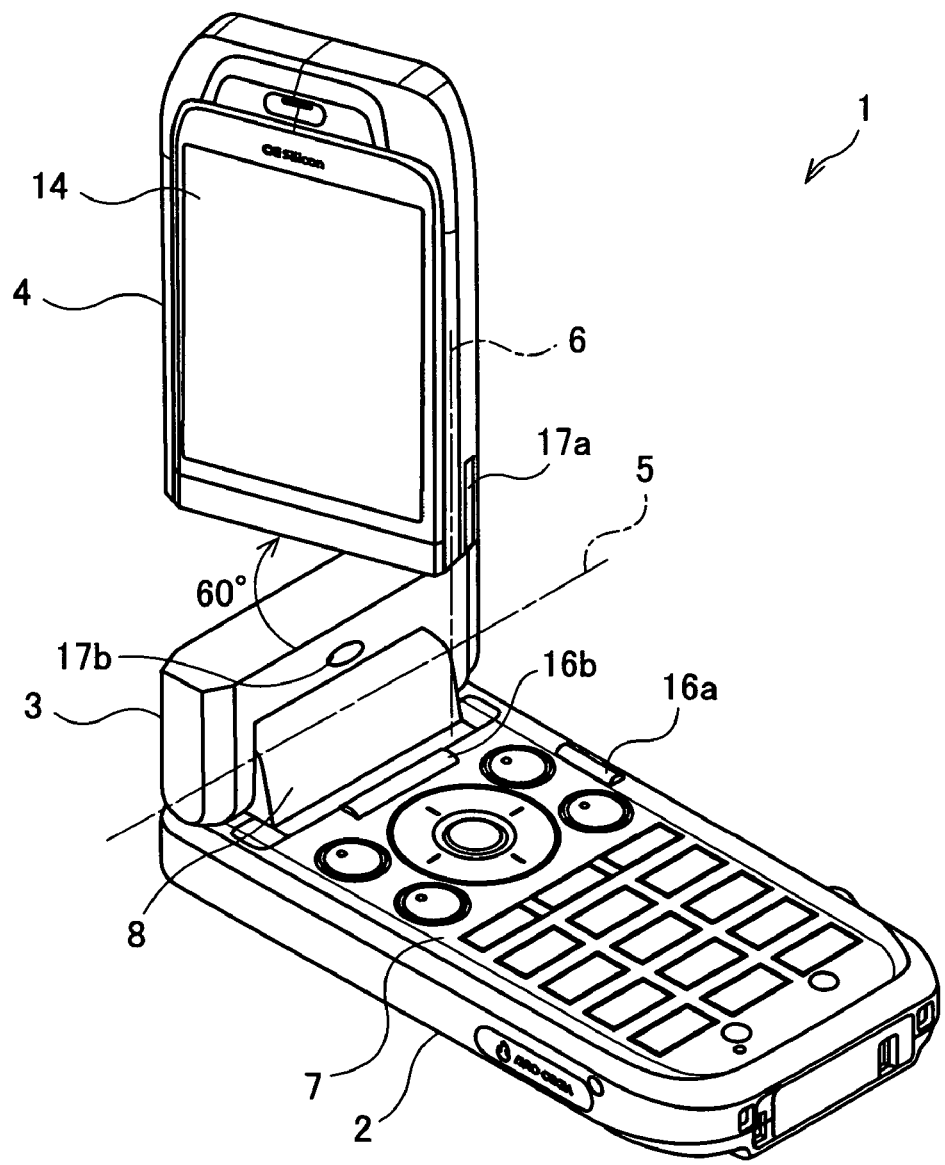
FIG. 7 illustrates an embodiment of the present invention and is a perspective view of the portable phone in FIG. 1 in a state in which the second housing is rotated 60 degrees on the second rotation axis.

Further, in the case in which a user lying down on a floor watches the portable phone 1 placed on a table, the second housing 4 is rotated on the second rotation axis 6 at an angle of 60 degrees, with the second housing 4 being rotated at an angle of 90 degrees on the first rotation axis 5, as shown in FIG. 7. By providing a clicking sense when the second housing 4 is rotated 60 degrees, the rotation can be modestly restrained. When the second housing 4 is attempted to be rotated over 60 degrees, it is allowed to be rotated up to 180 degrees. A clicking sense is not necessarily requested here.

Figure 8:
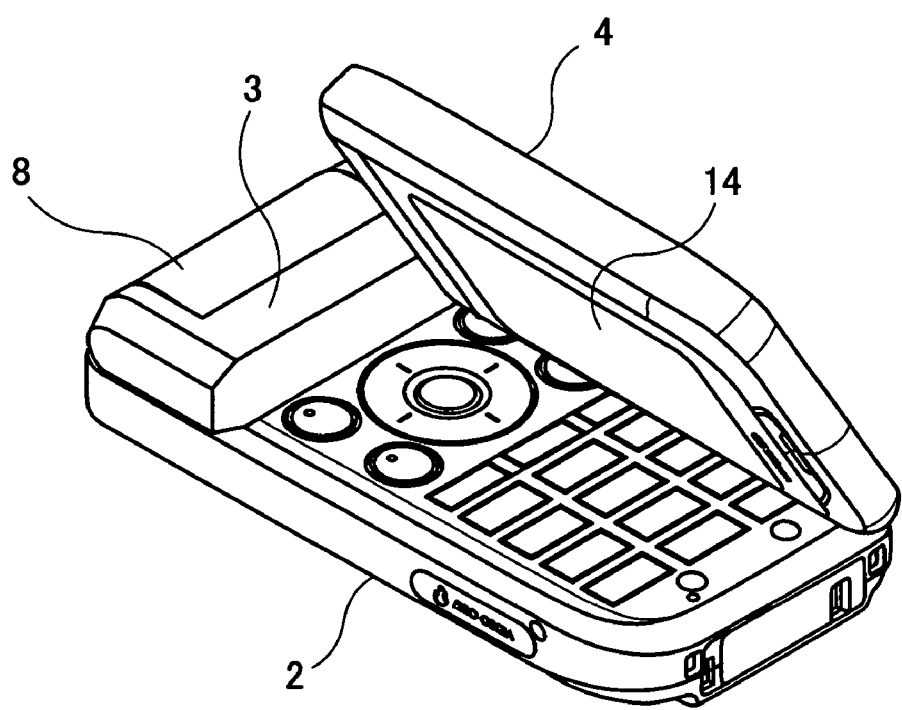
FIG. 8 illustrates an embodiment of the present invention and is a perspective view of the portable phone in FIG. 7 in a state in which the hinge section is rotated on the first rotation axis so as to overlap the first housing.
Figure 9:
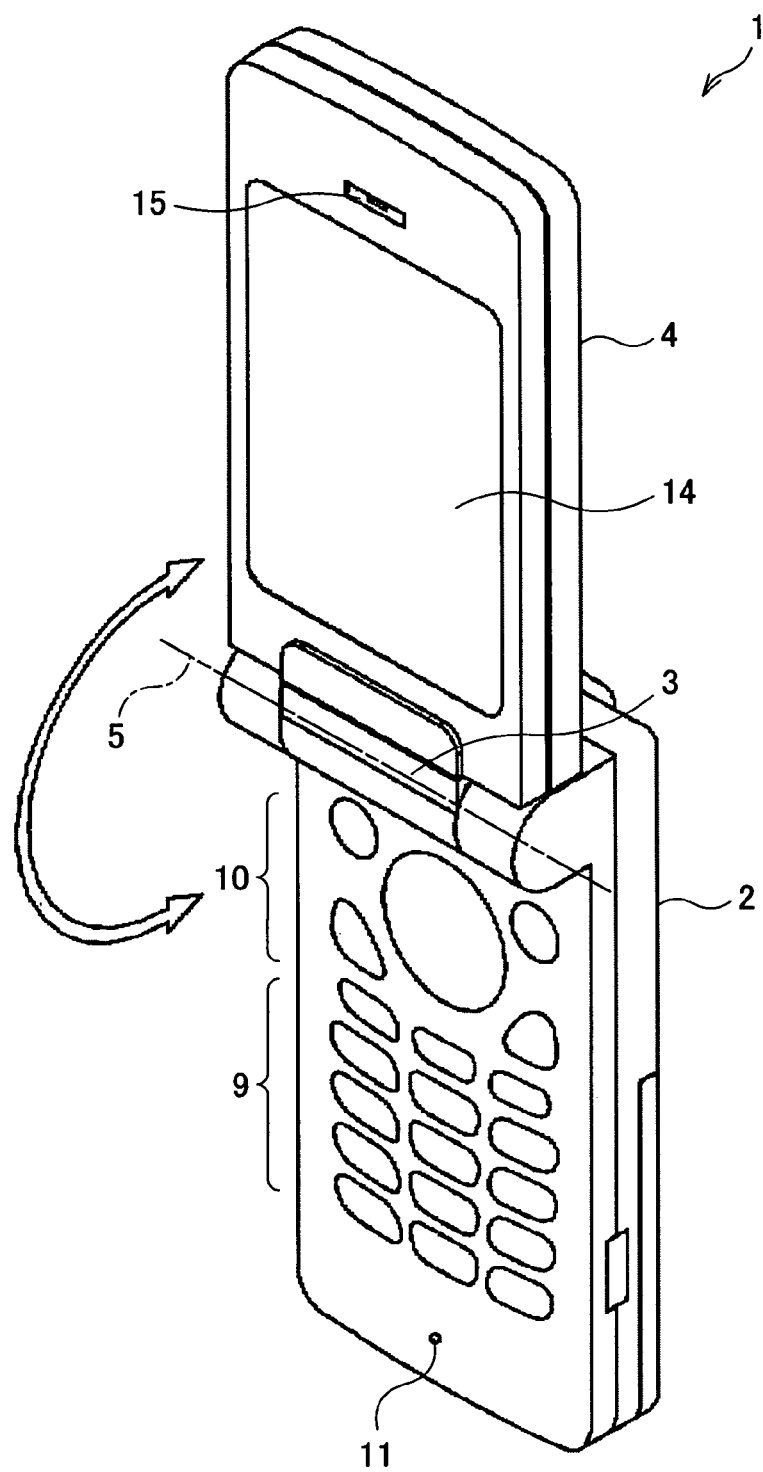
FIG. 9 illustrates a reference art and is a perspective view of a foldable portable phone having a rotation axis and in an unfolded state.
Figure 10:
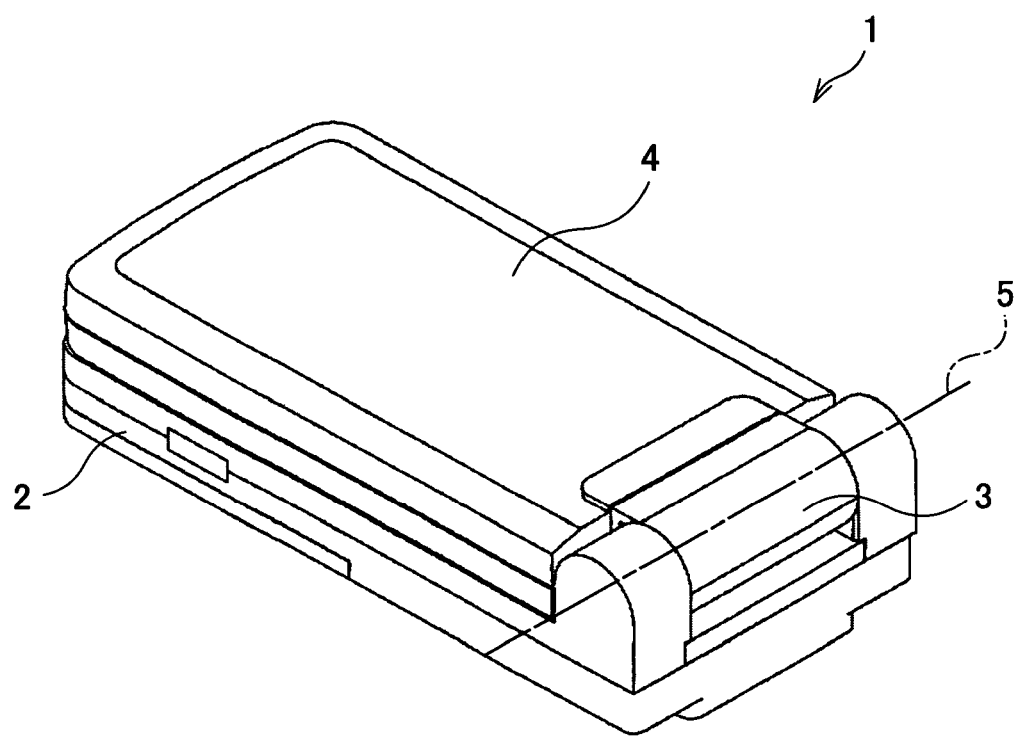
FIG. 10 illustrates a reference art and is a perspective view of the portable phone in FIG. 9 in a folded state.

When the second housing 4, being in the state illustrated in FIG. 7, is rotated 90 degrees on the first rotation axis 5, as shown in FIG. 8, the buffer section 17a disposed on the side face 4b of the second housing 4 is coupled with the convex section 16a disposed on the first housing 2, likewise the state illustrated in FIG. 6, and consequently the rotation of the second housing 4 on the second rotation axis 6 is restrained. Further, the buffer section 17b disposed on the surface of the hinge section 3 is coupled with the convex section 16b disposed on the first housing 2. Consequently, the rotation of the hinge section 3 on the first rotation axis 5 is restrained. At this time, the longer sides of the first display section 14 are substantially horizontal. In other words, the display section 14 is positioned horizontally. Moreover, the display section 14 is facing downward at an angle of 30 degrees. The foregoing operations, therefore, allow a user to watch television with a horizontally positioned screen facing downward at an angle of 30 degrees. The depression angle of the display section 14 depends upon the rotation angle of the second housing 4, is not limited to 30 degrees downward, and can be set at a desired angle.

In the portable phone 1, as described above, because the second rotation axis 6 is away for a certain distance from the second central face $\pi 2$, the display section 14 can be positioned horizontally by rotating the second housing 4 on the second rotation axis 6, and then rotating the hinge section 3 and the second housing 4 on the first rotation axis 5 so that the hinge section 3 and the second housing 4 are folded with respect to the first housing 2. Because the distance between the second rotation axis 6 and one of the side faces 4b that is closer to the second rotation axis 6 is slightly shorter than the distance between the first rotation axis 5 and the front face 7a of the first housing 2, the side face of the second housing would not interfere the front face of the first housing and would not incline. Therefore, the situation in which the display section 14 cannot be completely horizontal due to an interfering and inclining side face of the second housing can be avoided. Therefore, the display section 14 can be easily positioned horizontally.

In the portable phone 1, the first central face $\pi 1$ is flush with the second central face $\pi 2$. There may be, however, a situation in which they are not flush with each other. For example, there may be a situation in which the front face 7a of the first housing 2 extends wider in the direction parallel to the shorter sides of the front face 4a than the front face 4a. Even in this situation, it is still possible to position the display section 14 horizontally with respect to the hinge section 3 as long as the second rotation axis 6 is not on the second central face $\pi 2$.

Further, combination of rotation on the first rotation axis 5 and rotation on the second rotation axis 6 allows the display section 14 to face to any directions and to be positioned at any ways, such as vertical, horizontal, or between vertical and horizontal. Therefore, a user can set up the display section 14 in a desired direction and at a desired angle when placing the portable phone 1 on an object, such as a desk or a floor.

The foregoing describes an example of the present invention applied to a portable phone. The present invention can also be applied to other uses, such as a mobile camera. In a situation in which a user who is alone takes a picture with a self-timer with a mobile camera placed on a ground or on a stone, the present invention allows the user to take a picture with a display section set at a desired direction and at a desired angle. Moreover, the user can watch the object concurrently with taking a picture thereof. In this case, the display section and the imaging camera may be disposed on a single plane.

A portable device in connection with the present invention, as described above, includes the first housing, the second housing, and the hinge section. The hinge section is rotatable with respect to the first housing, on the first rotation axis disposed in a connection section between the hinge section and the first housing. The second housing is rotatable with respect to the hinge section, on the second rotation axis disposed in a connection section between the second housing and the hinge section toward the hinge section. The second rotation axis is disposed in such a way as to be substantially orthogonal to the first rotation axis, at a place apart from a central face of the second housing, the central face being orthogonal to the first rotation axis.

In the above structure, the display section can be positioned horizontally when the portable device is placed on an object.

Further, in order to solve the problems mentioned above, a portable device in connection with the present invention is characterized in that the portable device further includes a buffer section, and the second housing is rotatable on the second rotation axis up to an angle of substantially 180 degrees with respect to the hinge section. The buffer section restrains but not fixedly stops movement on the second rotation axis during rotation.

In the above structure, at a certain rotation angle at which the buffer section restrains but not fixedly stops movement on the second rotation axis, the rotation of the second rotation axis is modestly restrained, and a clicking sense is given. This allows a user to easily set the second housing at a certain rotation angle. Moreover, for example in the case in which the portable device is placed on an object, unintended rotation of the second housing caused by its own weight can be prevented.

Further, in order to solve the problems mentioned above, a portable device in connection with the present invention is characterized in that the buffer section restrains the hinge section at a rotation angle between 90 degrees and 150 degrees.

In the above structure, a user can set the second housing at a rotation angle adequate for turning the display section obliquely upward.

Further, in order to solve the problems mentioned above, a portable device in connection with the present invention is characterized in that a distance between the second rotation axis and one of side faces that are substantially parallel to the second rotation axis in the second housing, the one of side faces being closer to said second rotation axis, is either substantially identical with or shorter than a distance between the first rotation axis and a front face of the first housing.

In the above structure, when the first housing and the hinge section are folded so as to form an angle of 0 degree while keeping the second housing rotated at a certain angle to the hinge section, the side face of the second housing would not interfere the front face of the first housing and would not incline. Therefore, the situation in which the display section cannot be completely horizontal due to an interfering and inclining side face of the second housing can be avoided. This allows a user can easily set the display section horizontally when folding the hinge section toward the first housing.

Further, in order to solve the problems mentioned above, a portable devices in connection with the present invention is characterized in that a convex section is provided on a front face of the first housing, and a buffer section is provided on a side face of the second housing, or, a buffer section is provided on a front face of the first housing, and a convex section is provided on a side face of the second housing. The convex section and the buffer section are coupled with each other when the side face of the second housing overlaps a front face of the first housing.

In the above structure, the convex section and the buffer section are coupled to each other before a front face of the first housing is in contact with a side face of the second housing when the hinge section is folded so as to overlap the first housing concurrently with positioning the display section horizontally. Therefore, the second housing can be properly supported with the convex section and the buffer section, and rotation of the second housing can be restrained. Consequently, the second housing is stabilized.

Further, in order to solve the problems mentioned above, a portable device in connection with the present invention is characterized in that a convex section is provided on a front face of the first housing, and a buffer section is provided on a face, of the hinge section, that may be overlapped with the first housing, or, a buffer section is provided on a front face of the first housing, and a convex section is provided on a side, of the hinge section, that may be overlapped with the first housing. The convex section and the buffer section are coupled with each other when the first housing is folded so as to overlap the hinge section are folded.

In the above structure, the convex section and the buffer section are coupled with each other before a front face of the first housing is in contact with the hinge section when the hinge section is folded so as to overlap the first housing. Therefore, the hinge section can be properly supported with the convex section and the buffer section, and rotation of the hinge section is restrained. Consequently, the hinge section is stabilized.

Further, in order to solve the problems mentioned above, a portable device in connection with the present invention is characterized in that the buffer section is made of a cushioning material.

In the above structure, when the convex section and the buffer section are coupled with each other, scratching on the contacting sections of the convex section or the buffer section can be prevented.

Further, in order to solve the problems mentioned above, a portable device in connection with the present invention is characterized in that the portable device further includes a signal wire that connects the first housing and the second housing, and in the hinge section, the signal wire runs a region closer to the second rotation axis with respect to the central face.

In the above structure, it becomes possible to shorten the signal wire that connects the first housing and the second housing. Therefore, wiring cost can be reduced. Moreover, because the curvature of the signal wire can be shorter, disconnection of the signal wire can easily be prevented, and therefore the signal wire can last longer.

Further, in order to solve the problems mentioned above, a portable device in connection with the present invention is characterized in that the portable device includes a television broadcasting receiver instrument that receives television broadcasting and displays the received television broadcasting on the display section.

In the above structure, a user can adjust the display section to position either vertically or horizontally when watching television with the portable device placed on an object.

Further, in order to solve the problems mentioned above, a portable device in connection with the present invention is characterized in that the first rotation axis is away for a certain distance from a front face of the first housing. A distance between the second rotation axis to one of side faces that include longer sides of a front face of the second housing and are orthogonal to the front face, the one of side faces being closer to the second rotation axis, is either substantially identical with or shorter than a distance between the first rotation axis and the front face of the first housing.

The portable device in connection with the present invention allows a display section to be positioned either vertically or horizontally at a desired elevation/depression angle in a condition, for example, in which the portable device is disposed on a desk. The present invention can be applied to a device currently in the market, such as a portable phone having a television and a portable device having a camera, such as a digital camera including a liquid crystal display.

The present invention is not to be limited in the embodiments described above, and can be modified in various ways within the scope specified in the Claims. In other words, embodiments achieved by combinations of modified technical methods within the scope specified in the Claims are also to be included within the technical scope of the present invention.

In addition, the embodiments and examples specifically explained in the DESCRIPTION OF THE EMBODIMENTS are merely explaining technical contents of the present invention. The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A portable device comprising a first housing, a second housing having a display section, and a hinge section connected both to said first housing and said second housing, said hinge section being rotatable with respect to the first housing, on a first rotation axis disposed in a connection section between the hinge section and said first housing, said second housing being rotatable with respect to said hinge section on a second rotation axis disposed in a connection section between the second housing and said hinge section, and said second rotation axis being disposed in such a way as to be substantially orthogonal to said first rotation axis, at a place apart from a central face of said second housing, the central face being orthogonal to said first rotation axis.

2. A portable device as set forth in claim 1, further comprising a buffer section, said second housing being rotatable on the second rotation axis up to an angle of substantially 180 degrees with respect to said hinge section, and the buffer section restraining but not fixedly stopping movement on the second rotation axis during rotation.

3. A portable device as set forth in claim 2, wherein said buffer section restrains said hinge section at a rotation angle between 90 degrees and 150 degrees.

4. A portable device as set forth in claim 1, wherein a distance between said second rotation axis and one of side faces that are substantially parallel to said second rotation axis in said second housing, said one of side faces being closer to said second rotation axis, is either substantially identical with or shorter than a distance between said first rotation axis and a front face of said first housing.

5. A portable device as set forth in claim 1, wherein, a convex section is provided on a front face of said first housing, and a buffer section is provided on a side face of said second housing, or a buffer section is provided on a front face of said first housing, and a convex section is provided on a side face of said second housing, and the convex section and the buffer section are coupled with each other when the side face of said second housing overlaps said front face of said first housing.

6. A portable device as set forth in claim 1, wherein, a convex section is provided on a front face of said first housing, and a buffer section is provided on a face of said hinge section that may be overlapped with said first housing, or a buffer section on is provided on a front face of said first housing, and a convex section is provided on a face of said hinge section that may be overlapped with said first housing, and the convex section and the buffer section are coupled with each other when said first housing is folded so as to overlap said hinge section.

7. A portable device as set forth in claim 5, wherein said buffer section is made of a cushioning material.

8. A portable device as set forth in claim 1, further comprising a signal wire that connects said first housing and said second housing, and in the hinge section, said signal wire runs a region closer to the second rotation axis with respect to said central face.

9. A portable device as set forth in claim 1, comprising a television broadcasting receiver means that receives television broadcasting and displays the received television broadcasting on said display section.

10. A portable device as set forth in claim 1, wherein, said first rotation axis is away for a certain distance from a front face of said first housing, and a distance between said second rotation axis and one of side faces that include longer sides of a front face of said second housing and are orthogonal to the front face, said one of side faces being closer to the second rotation axis, is either substantially identical with or shorter than a distance between said first rotation axis and the front face of said first housing.

* * * * *